United States Patent
Lee et al.

(10) Patent No.: US 8,495,303 B2
(45) Date of Patent: Jul. 23, 2013

(54) PROCESSOR AND COMPUTER SYSTEM WITH BUFFER MEMORY

(75) Inventors: Sang Suk Lee, Busan (KR); Suk Jin Kim, Seoul (KR); Yeon Gon Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 788 days.

(21) Appl. No.: 12/176,605

(22) Filed: Jul. 21, 2008

(65) Prior Publication Data

US 2009/0228659 A1 Sep. 10, 2009

(30) Foreign Application Priority Data

Mar. 6, 2008 (KR) .................. 10-2008-0020939

(51) Int. Cl.
*G06F 13/00* (2006.01)
(52) U.S. Cl.
USPC .................... 711/131; 711/154
(58) Field of Classification Search
USPC .................................... 711/131
See application file for complete search history.

(56) References Cited

U.S. PATENT DOCUMENTS

| | | | |
|---|---|---|---|
| 5,642,494 A | 6/1997 | Wang et al. | |
| 6,157,984 A * | 12/2000 | Fisher et al. | 711/112 |
| 6,604,156 B1 * | 8/2003 | Slivkoff et al. | 710/57 |
| 6,615,302 B1 * | 9/2003 | Birns | 710/121 |
| 6,675,280 B2 * | 1/2004 | Cooksey et al. | 711/204 |
| 6,732,255 B1 * | 5/2004 | Ling et al. | 712/42 |
| 2003/0110356 A1 * | 6/2003 | Williams, III | 711/133 |
| 2005/0216613 A1 * | 9/2005 | Ganapathy et al. | 710/22 |

FOREIGN PATENT DOCUMENTS

| | | |
|---|---|---|
| JP | 02-188856 | 7/1990 |
| JP | 07-219845 | 8/1995 |
| JP | 07-253925 | 10/1995 |
| JP | 09-146839 | 6/1997 |
| KR | 1019990047968 A | 7/1999 |
| KR | 1019990069073 A | 9/1999 |

* cited by examiner

*Primary Examiner* — Reba I Elmore
(74) *Attorney, Agent, or Firm* — NSIP Law

(57) ABSTRACT

A processor and a computing system include a processor core and a buffer memory to read word data from a memory. The read word data includes first byte data read by the processor core from the memory. The buffer memory also stores the read word data, and determines whether second byte data requested by the processor core is stored in the buffer memory.

20 Claims, 8 Drawing Sheets

PROCESSOR AND COMPUTER SYSTEM WITH BUFFER MEMORY

CROSS-REFERENCE TO RELATED APPLICATION

This application claims the benefit under 35 U.S.C. § 119(a) of a Korean Patent Application No. 10-2008-0020939, filed on Mar. 6, 2008, in the Korean Intellectual Property Office, the disclosure of which is incorporated herein by reference in its entirety.

TECHNICAL FIELD

The following description relates to a processor and a memory hierarchy, and more particularly, to a memory for supporting an operation of a processor core and an apparatus and/or system using the same.

BACKGROUND

A host or a processor may access a storage device in order to read data stored in the storage device or to store data in the storage device. Since time for reading data from the storage device by either the host or the processor may be relatively long, the host or the processor may use a memory to store a portion of the data stored in the storage device. In this case, a data input/output time of the memory may be shorter than that of the storage device.

The host or the processor may have a tendency to read again the read data within a short time period. This tendency may be referred to as the temporal locality. A conventional data input/output management system may use a buffer memory to store the data read from the storage device by either the host or the processor based on the temporal locality.

Due to an increase in operating speed of the host or the processor, a faster buffer memory has been required. Moreover, a cache memory being closest to the host or the processor and operating the fastest, and a main memory being located between the cache memory and the storage device, while operating more slowly than the cache memory but operating more quickly than the storage device, have been used. The processor—the cache memory—the main memory—the storage device structure may be referred to as a memory hierarchy, and the cache memory may include a layer based on a plurality of levels including a Level 1 (L1) cache memory and a Level 2 (L2) cache memory depending on applications.

SUMMARY

In one general aspect, there is provided a processor, a memory, or a computing system which reduces a bank conflict where a host (or a processor) accesses the memory.

In another general aspect, there is provided a processor, a memory, or a computing system which provides an appropriate memory hierarchy for an operation of a multi-port processor core.

In still another general aspect, there is provided a processor, a memory, or a computing system which reduces a number of accesses to the memory by a host (or the processor).

In yet another general aspect, a processor includes a processor core, a buffer memory to read word data from a memory, the read word data including first byte data read by the processor core from the memory, and to store the read word data, wherein the buffer memory determines whether second byte data requested by the processor core is stored in the buffer memory.

The processor core may include a plurality of input/output ports. The buffer memory may store an address of the read word data along with the read word data, the address indicating a location of the word data in the memory, compare an address of the second byte data and the stored address in the buffer memory, and determine whether the second byte data is stored in the buffer memory according to the comparison between the address of the second byte data and the stored address in the buffer memory.

Where the second byte data is stored in the buffer memory, the buffer memory may output the stored second byte data to the processor core and drop a data request of the second byte data to the memory.

The buffer memory may determine whether fourth byte data corresponding to an address of third byte data is stored in the buffer memory, the third byte data to be stored in the memory by the processor core, and the buffer memory may invalidate the stored word data including the stored the fourth byte data where the fourth byte data is stored in the buffer memory.

The processor core may access the memory without referring to the buffer memory for storing data in the memory.

The processor may further comprise a plurality of load/store units connected with the processor core, wherein the processor core may process a plurality of commands in parallel.

In still yet another general aspect, there is provided a buffer memory for connection with a processor core and a cache memory, wherein the buffer memory reads word data from the cache memory, the word data including first byte data read by the processor core from the cache memory, stores the read word data, and determines whether second data requested by the processor core is stored in the buffer memory. The buffer memory may be provided between the processor core and the cache memory.

The buffer memory may further comprise a plurality of ports, wherein the buffer memory may process in parallel a plurality of data requests from the processor core through the plurality of ports.

The buffer memory may store an address of the word data read from the cache memory along with the word data, the address indicating a location of the word data in the cache memory, compare an address of the second byte data and the stored address, and determine whether the second byte data is stored in the buffer memory.

Where the second byte data is stored in the buffer memory, the buffer memory may outputs the stored second byte data to the processor core.

The buffer memory may determine whether fourth byte data corresponding to an address of third byte data is stored in the buffer memory, the third byte data to be stored in the cache memory by the processor core, and the buffer memory may invalidate the stored word data including the stored fourth byte data where the fourth byte data is stored in the buffer memory.

In still yet another general aspect, a computing system includes a processor core, a memory, and a buffer memory to read word data from the memory, the word data including first byte data read by the processor core from the memory, and to store the read word data. The buffer memory may determine whether second byte data requested by the processor core is stored in the buffer memory.

The processor core may include a plurality of input/output ports.

The memory may include a plurality of banks, and the buffer memory may correspond to the each bank one-by-one.

The computing system may further comprise a multiplexer to select one of data outputted from the memory and data outputted from the buffer memory based on whether the second byte data requested by the processor core is stored in the buffer memory, and to output the selected data to the processor core.

The buffer memory may store an address of the word data read from the memory along with the word data, the address indicating a location of the word data in the memory. The buffer memory may compare an address of the second byte data and the stored address, and determine whether the second byte data is stored in the buffer memory.

Where the second byte data is stored in the buffer memory, the buffer memory may output the stored second byte data to the processor core.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

Figure 1:
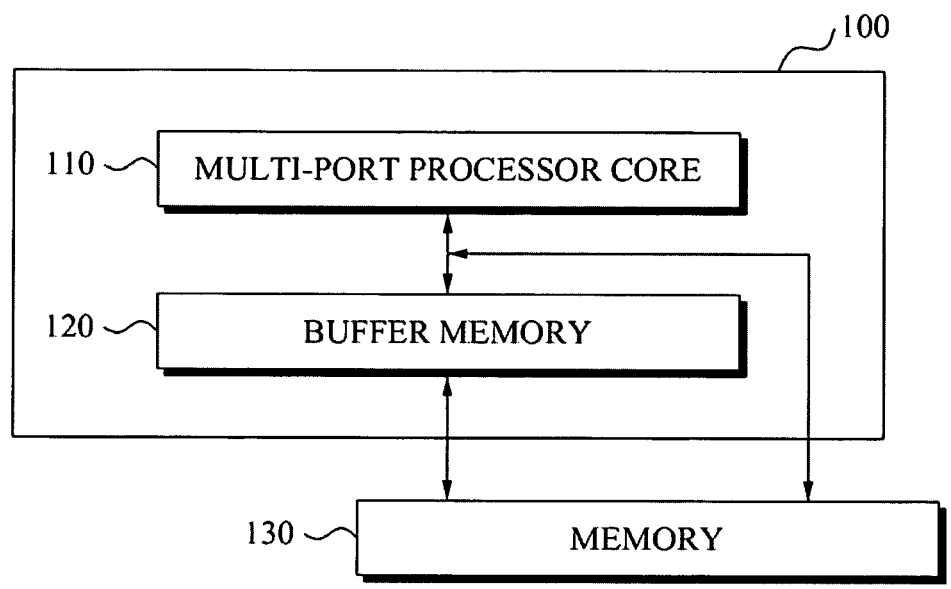
FIG. 1 is a diagram illustrating a processor according to an exemplary embodiment.

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

A processor structure for simultaneously processing a plurality of commands in parallel in order to increase a command processing speed of a processor may be used. Either a load command or a store command may be processed in parallel in a parallel processor. Accordingly, the parallel processor may include a plurality of load/store units to process either the load command or the store command, and a memory unit of the parallel processor may include a plurality of ports to process a plurality of either load commands or store commands in parallel.

A cache memory may be efficiently used as a memory in a computer system, being located between a processor core and a main memory, operating more quickly than the main memory, and having a capacity smaller than that of the main memory. There is a possibility that data accessed by either a processor or a host is again accessed by the processor or the host within a short time period. Accordingly, the cache memory may store the data accessed by the processor or the host, and quickly provide the processor or the host with the requested data where an access request from the processor or the host exists.

Depending on computing systems, a Level 1 (L1) cache memory and a Level 2 (L2) cache memory having a larger capacity than that of the L1 cache memory while operating more slowly than the L1 cache memory, may be included. Generally, a processing speed of the L2 cache memory is quicker than that of the main memory and a capacity of the L2 cache memory is smaller than that of the main memory. The L1 cache memory and the L2 cache memory may be embodied on the same semiconductor chip with the processor. This case is referred to as an on-chip cache.

Where data requested by the processor is stored in the cache memory, the cache memory may quickly provide the requested data for the processor. This case is referred to a cache hit. Where the data requested by the processor is not stored in the cache memory, the processor may read the requested data from the main memory (or the L2 cache memory). This case is referred to a cache miss, and a time required for reading the requested data where the cache miss occurs may be longer than a time required for reading the requested data where the cache hit occurs. A relatively longer time required for reading the requested data where the cache miss occurs is referred to as a penalty.

The cache memory may include a logic to determine whether data requested by the processor corresponds to a cache hit. Where a cache miss occurs, the cache memory may store the data transmitted from the main memory to the processor and prepare for a subsequent request of the processor. Where a space for storing does not exist in the cache memory, a portion of the data stored in the cache memory may be evicted to the main memory. The cache memory may include a logic to determine which data is evicted.

Since the cache memory includes the logic to determine whether the cache hit occurs and the logic to determine which data is evicted, the cache memory may include a single port.

A parallel processor may include a plurality of load/store units. Each of the plurality of load/store units may process either a load command or a store command in parallel. Where different load/store units access the same single port cache memory, the access requests may be sequentially processed.

The cache memory may include a plurality of banks. Each memory bank may operate in parallel and independently provide the processor with the data.

A case where the different load/store units access the same single port cache memory bank is referred to as a bank conflict, and where the bank conflict occurs, an access request to a bank may be sequentially processed, and a processing time may increase during the above-described process.

According to an aspect, the bank conflict among the plurality of load/store units may be reduced by locating a buffer memory between the cache memory and the processor.

Exemplary embodiments described herein are based on a case where a cache memory is used. However, it is understood that teachings of the exemplary embodiments may also be applied for a case where a structure including a scratchpad memory (SPM) and the like is used. The SPM may include a simple hardware configuration, may exclude an internal control circuit and the like, and may be controlled by software.

FIG. 1 illustrates a processor 100 according to an exemplary embodiment.

As illustrated in FIG. 1, the processor 100 includes a multi-port processor core 110 and a buffer memory 120. The processor 100 may read data from a memory 130 and store data in the memory 130.

The multi-port processor core 110 may include a plurality of load/store units (not shown). Each of the plurality of load/store units may load or store data independently and/or simultaneously with each other.

The buffer memory 120 may read word data from the memory 130, the read word data including first byte data read by the multi-port processor core 110 from the memory 130, and store the read word data. Where the multi-port processor core 110 requests second byte data, the buffer memory 120 determines whether the requested second byte data is stored in the buffer memory 120.

The multi-port processor core 110 may process the data by byte. Each of the plurality of load/store units in the multi-port processor core 110 may process the data by byte.

The memory 130 may process the data by byte, or may process the data by word. The memory 130 may process the data by word within a time required for processing the data by byte.

Where an address of the first byte data corresponds to "1001", an address of the word data including the first byte data corresponds to "10XX". Here, X denotes "don't care", and selecting any one of "1" and "0" makes no difference.

The word data corresponds to byte data corresponding to an address "1000", byte data corresponding to an address "1001" (the first byte data), byte data corresponding to an address "1010", and byte data corresponding to an address "1011".

A time required for outputting the word data by the memory 130 may be the same or similar to a time required for outputting the byte data, and the buffer memory 120 may read the word data from the memory 130 without an additional time penalty.

Generally, a word corresponds to a bit array of 32 bits and a byte corresponds to a bit array of 8 bits, however, exemplary embodiments are not limited to the bit array of either 32 bits or 8 bits and are applied to a data structure including the word including a plurality of bytes.

The memory 130 may be a cache memory or an SPM (Scratchpad Memory). Where the memory 130 is the SPM, the multi-port processor core 110 may control an operation of the memory 130.

Generally, data accessed by the multi-port processor core 110 may be accessed again within a short time period. This tendency is referred to as temporal locality of a data access. The temporal locality is not limited to only the same data, and data located around the previously-accessed data may also be accessed within a short time period.

The buffer memory 120 may reduce a number of accesses to the memory 130 by the multi-port processor core 110 by storing peripheral byte data of the first byte data accessed by the multi-port processor core 110. Since the buffer memory 120 may store the frequently-referred data, the buffer memory 120 may be referred to as a Frequent Value Buffer (FVB).

Where the different byte data included in the same word data are accessed within a short time period, the processor 100 may reduce the number of accesses to the memory 130.

The processor 100 may reduce power consumption when transmitting the data between the processor 100 and the memory 130 by reducing a number of data transmissions between the processor 100 and the memory 130.

The processor 100 may reduce a restriction condition when compiling a program code in a compiler by reducing a number of memory access conflicts.

The buffer memory 120 may store an address of the read word data along with the word data read from the memory 130, the address indicating a location of the word data in the memory 130. The buffer memory 120 may compare an address of the second byte data and the address stored in the buffer memory 120, and determine whether the second byte data is stored in the buffer memory 120.

The buffer memory 120 may compare a remaining address excluding the two least significant bits from among addresses of the second byte data and the address stored in the buffer memory 120. The two least significant bits are values corresponding to a size difference of the byte data and the word data. The buffer memory 120 may output the second byte data using the address including the address of the two low order bits when transmitting the second byte data to the multi-port processor core 110.

Where the second byte data requested by the multi-port processor core 110 is determined to be stored in the buffer memory 120, it may indicate that an FVB hit occurs. Conversely, where the second byte data is determined not to be stored in the buffer memory 120, it may indicate that an FVB miss occurs. Since these expressions are for the convenience of the description, it is understood that claims recited herein is not to be limited by these expressions.

Where the second byte data is stored in the buffer memory 120, the buffer memory 120 may output the second byte data stored in the buffer memory 120 to the multi-port processor core 110. Where an FVB hit with respect to the second byte data occurs, the multi-port processor core 110 may read the second byte data from the buffer memory 120 to eliminate a need for accessing the memory 130.

Where the second byte data is stored in the buffer memory 120, the multi-port processor core 110 may drop a data request of the second byte data to the memory 130. Where the FVB hit with respect to the second byte data occurs, the multi-port processor core 110 may avoid an access conflict with the memory 130 by dropping an access request to the memory 130.

For example, a first port (not shown) of the multi-port processor core 110 may request the second byte data, and a second port (not shown) of the multi-port processor core 110 may simultaneously request fifth byte data. Where the FVB hit with respect to the second byte data occurs, the first port may read the second byte data from the buffer memory 120. Thus, the first port does not need to access the memory 130. Accordingly, the second port may read the fifth byte data from the memory 130 without a conflict with the first port.

The buffer memory 120 may determine whether fourth byte data corresponding to an address of third byte data is stored in the buffer memory 120, and whether the third byte data is to be stored in the memory 130 by the multi-port processor core 110. Where the fourth byte data is stored in the buffer memory 120, the buffer memory 120 may invalidate the stored word data including the stored fourth byte data.

The multi-port processor core 110 may store data using a store command. The multi-port processor core 110 may store the data in the memory 130, and the third byte data stored in this case is the data being more recent than the fourth byte data stored in the buffer memory 120.

The buffer memory 120 may store the address of the word data along with the word data including the first byte data read from the memory 130, the address indicating the location of the word data in the memory 130. Accordingly, the buffer memory 120 may determine whether the address of the third byte data stored by the store command is stored in the buffer memory 120. The buffer memory 120 may determine whether the fourth byte data is stored in the buffer memory 120 by determining whether the address of the third byte data is stored.

Since the third byte data being more recent than the fourth byte data is stored in the memory 130 where the fourth byte data is stored in the buffer memory 120 (or the address of the third byte data is stored in the buffer memory 120), the fourth byte data may be regarded as old data. Accordingly, the buffer memory 120 may invalidate the stored fourth byte data where the address of third byte data is stored in the buffer memory 120. The buffer memory 120 and the memory 130 may maintain coherence among data using the above-described process.

Depending on exemplary embodiments, the buffer memory 120 may invalidate the stored word data including the stored fourth byte data.

The multi-port processor core 110 may directly access the memory 130 without referring to the buffer memory 120 for processing the store command to store the data in the memory 130. The store command may be transmitted to the buffer memory 120. The buffer memory 120 may identify the address of the third byte data from the transmitted store command.

Figure 2:
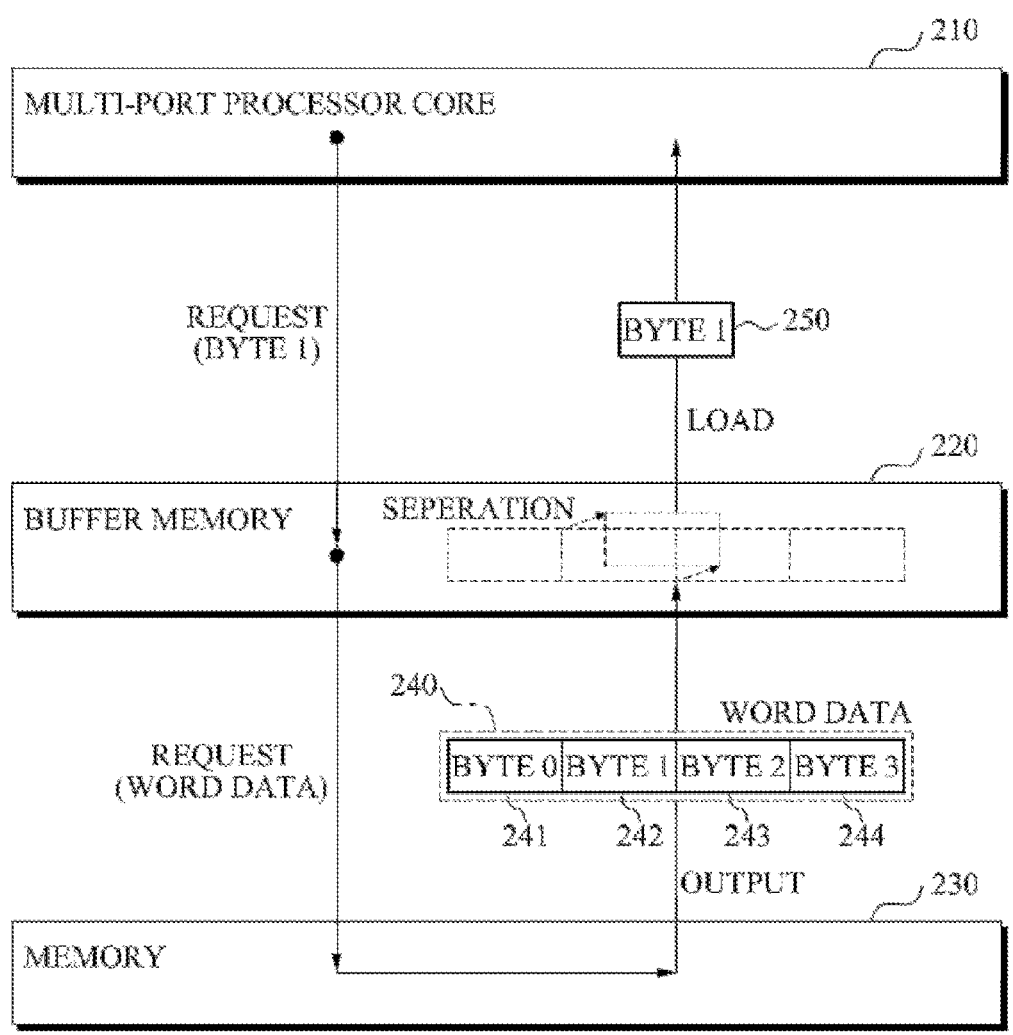
FIG. 2 is a diagram illustrating a load command processing process using a multi-port processor core, a buffer memory, and a memory according to an exemplary embodiment.

FIG. 2 illustrates a load command processing process using a multi-port processor core 210, a buffer memory 220, and a memory 230 according to an exemplary embodiment.

Referring to FIG. 2, the multi-port processor core 210 loads byte (1) 250 from the memory 230 through the buffer memory 220.

The memory 230 outputs word data 240 to the buffer memory 220. The word data 240 includes byte (1) 250 requested from the multi-port processor core 210 through the buffer memory 220. The word data 240 includes byte (0) 241, byte (1) 242, byte (2) 243, and byte (3) 244. Byte (1) 242 includes the same contents as byte (1) 250.

The buffer memory 220 stores the word data 240 read from the memory 230, and stores an address of the word data 240. The address indicates a location of the word data 240 in the memory 230. The buffer memory 220 may store each address of the byte (0) through byte (3) indicating a location of the byte (0) through byte (3) in the memory 230.

The buffer memory 220 separates the byte (1) 250 requested from the multi-port processor core 210 from the word data 240 read from the memory 230, and transmits the separated byte (1) 250 to the multi-port processor core 210.

For example, the memory 230 may be either a Static Random Access Memory (SRAM) or a Dynamic Random Access Memory (DRAM). The SRAM or the DRAM may select data using a row address and a column address, and output the selected data. A row of a memory cell array of the SRAM or the DRAM may be selected by the row address, and a column by byte or by word may be selected by the column address. Where a single row is selected, the data may be selected by byte or by word using the column address in the selected row, and a time required for selecting byte data and a time required for selecting word data may be same or similar.

The memory 230 may output the word data and may output the byte data. However, required times in any case may be the same or similar. Since a hardware configuration required for outputting the word data by the memory 230 and a hardware configuration required for outputting the byte data are similar, the memory 230 may not incur an additional cost for outputting the word data where a request of the byte data from the multi-port processor core 110 exists.

The multi-port processor core 210 may access the byte data located near the once-accessed byte data within a short time period. As described above, this is referred to as time locality. Since the multi-port processor core 210 may read the byte data stored in the buffer memory 220 where the byte data requested by the multi-port processor core 210 is stored in the buffer memory 220, a need for accessing the memory 230 may be eliminated.

Where the different byte data included in the same word data are accessed within a short time period, the buffer memory 220 may reduce a number of accesses to the memory 230 by the multi-port processor core 210. The buffer memory 220 may reduce power consumption by reducing a number of data transmissions between the multi-port processor core 210 and the memory 230.

The buffer memory 220 may reduce a restriction condition when compiling a program code in a compiler by reducing a number of conflicts when accessing the memory 230.

Figure 3:
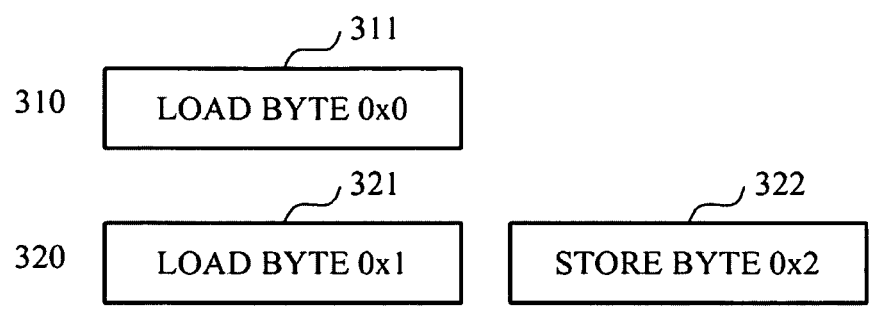
FIG. 3 is a diagram illustrating a process of avoiding a conflict when accessing a memory of FIG. 1 using the processor of FIG. 1 according to an exemplary embodiment.

FIG. 3 illustrates an exemplary process of avoiding a conflict when accessing the memory 130 of FIG. 1 using the processor 100 of FIG. 1 according to an exemplary embodiment.

Referring to FIGS. 1 and 3, the processor 100 processes a load command 311 with respect to byte 0x0 during a first time slot 310. The memory 130 outputs word data including byte 0x0, byte 0x1, byte 0x2, and byte 0x3, and the buffer memory 120 stores the word data outputted from the memory 130. The buffer memory 120 may store an address of the word data in the memory 130. The buffer memory may store an address of each byte in the memory 130.

The processor 100 processes a load command 321 with respect to byte 0x1 and a store command 322 with respect to byte 0x2 during a second time slot 320.

A first port of the multi-port processor core 110 processes the load command 321 with respect to byte 0x1, and a second port of the multi-port processor core 110 processes the store command 322 with respect to byte 0x2.

The buffer memory 120 separates an address "0x1" from the load command 321 with respect to byte 0x1, and determines whether the separated address "0x1" is stored in the buffer memory 120. Since the buffer memory 120 stores the address of the word data during the first time slot 310, the address "0x1" is stored in the buffer memory 120. Where the address "0x1" is stored in the buffer memory 120, the buffer memory 120 transmits the stored byte "0x1" to the multi-port processor core 110.

Where the address "0x1" is stored in the buffer memory 120, either the buffer memory 120 or the multi-port processor core 110 may drop an access request to the memory 130 by the load command 321 with respect to byte 0x1. Either the buffer memory 120 or the multi-port processor core 110 may avoid an access conflict with the memory 130 by controlling the first port of the multi-port processor core 110 not to access the memory 130.

A second port of the multi-port processor core 110 accesses the memory 130 in order to process the store command 322 with respect to byte 0x2. The second port may directly access the memory 130 without accessing the buffer memory 120 when processing the store command.

Since the first port reads byte 0x1 from the buffer memory 120 without accessing the memory 130, the second port may store byte 0x2 in the memory 130 without conflicting with the first port. The processor 100 may process in parallel the load command 321 with respect to byte 0x1 and the store command 322 with respect to byte 0x2 during the second time slot 320 without a conflict.

The buffer memory 120 may intercept the store command 322 while the second port processes the store command 322, and separate the address "0x2" of the store command 322. The buffer memory 120 may determine whether the address "0x2" of the store command 322 is stored in the buffer memory 120. Since the address "0x2" is stored in the buffer memory 120 during the first time slot 310, the buffer memory 120 determines that the address "0x2" of the store command 322 is stored in the buffer memory 120. Where the address "0x2" of the store command 322 is stored in the buffer memory 120, the buffer memory 120 may invalidate the stored byte 0x2.

Since the second port stores a new byte 0x2 in the memory 130 using the store command 322, the byte 0x2 stored in the buffer memory 120 is old data. The buffer memory 120 may invalidate the byte 0x2 corresponding to the old data in order to maintain data coherence.

Figure 4:
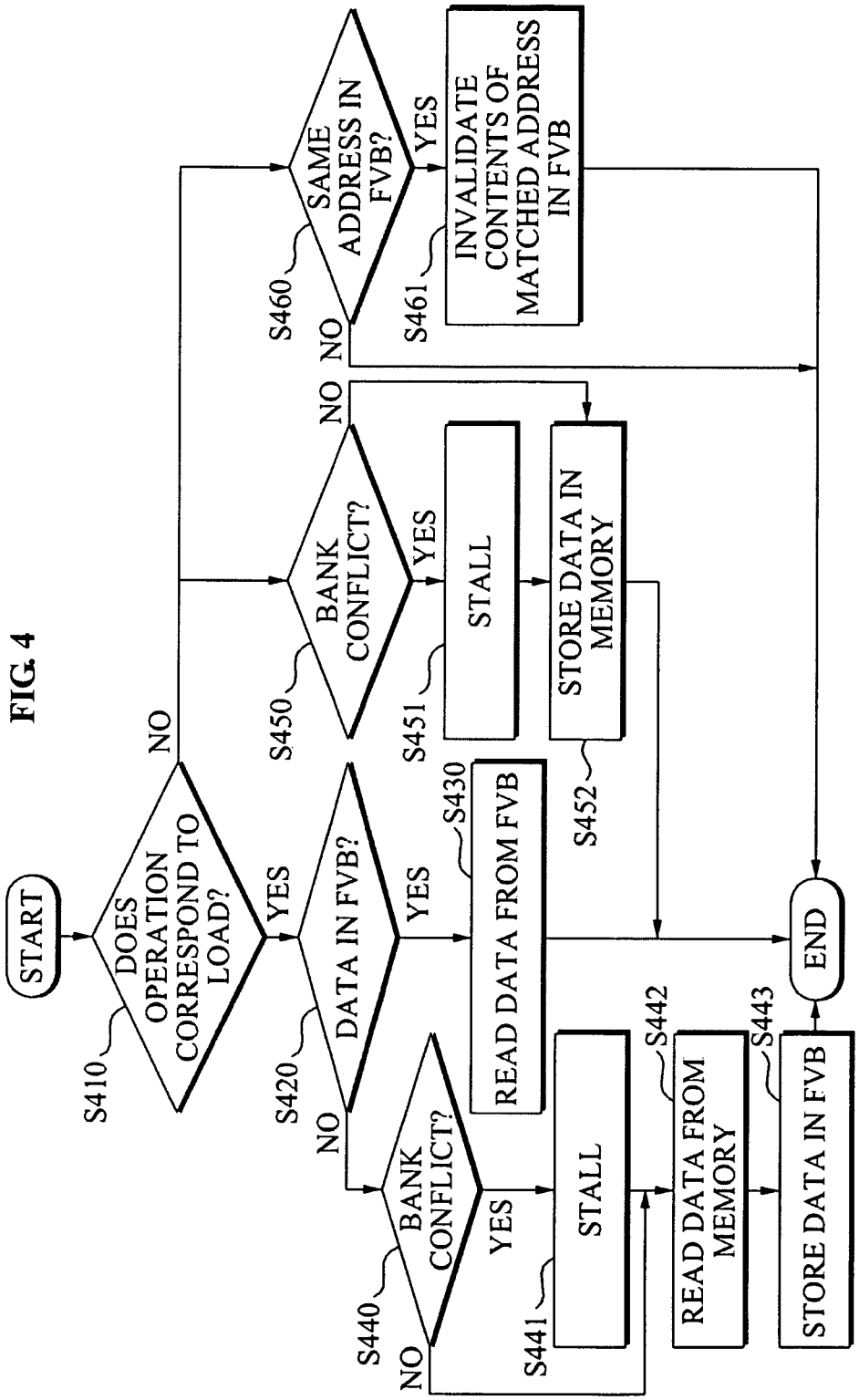
FIG. 4 is a flowchart illustrating an operation of a processor and a Frequent Value Buffer (FVB) according to another exemplary embodiment.

FIG. 4 illustrates an operation of a processor and an FVB according to another exemplary embodiment. As an illustration only, the operation of the processor and the FVB will be described with reference to FIG. 1. The buffer memory 120 in the FIG. 1 may be the FVB.

Referring to FIG. 4, in operation S410, the processor 100 determines whether an operation executed by a predetermined command accessing a memory corresponds to a load command and/or a load operation.

In operation S420, where it is determined that the operation corresponds to the load command in the operation S410, the FVB 120 determines whether data requested by the processor 100 is stored in the FVB 120.

In operation S430, where it is determined that the requested data is stored in the FVB 120 in the operation S420, the processor 100 reads the requested data from the FVB 120.

Where it is determined that the requested data is not stored in the FVB 120 in the operation S420, the processor 100 requests the data from the memory 130.

In operation S440, the memory 130 from which the processor 100 requests the data, determines whether a bank conflict occurs.

A meaning of the bank conflict may denote a case where a plurality of access requests to the same word data exists.

In operation S441, where it is determined that the bank conflict occurs in the operation S440, the memory 130 sequentially processes a data request, and the processor 100 stalls while the data request is sequentially processed.

In operation S442, where the memory 130 is able to process the data request from the processor 100, the processor 100 reads the data from the memory 130.

In operation S443, the FVB 120 stores the data read from the processor 100 in the FVB. The memory 130 may output word data including byte data requested by the processor 100, and the FVB 120 may store the word data outputted from the memory 130. The FVB 120 may store an address of the word data along with the word data.

In operation S442, where it is determined that the bank conflict does not occur in the operation S440, the processor 100 reads the data from the memory 130.

Where it is determined that the operation corresponds to a store command/operation other than the load command/operation in the operation S410, the processor 100 accesses the memory 130. In operation S450, the memory 130 to which the processor 100 requests an access determines whether the bank conflict occurs.

In operation S451, where it is determined that the bank conflict occurs in the operation S450, the memory 130 sequentially processes an access request, and the processor 100 stalls while the access request is sequentially processed.

In operation S452, where the memory 130 is able to process the access request from the processor 100, the processor 100 stores the data in the memory 130.

In the operation S452, where it is determined that the bank conflict does not occur in the operation S450, the processor 100 stores the data in the memory 130.

Where it is determined that the operation corresponds to the store command/operation other than the load command/operation in the operation S410, the FVB 120 identifies an address from the store command/operation of the processor 100. In operation S460, the FVB determines whether the address of the store command corresponds to any one of addresses stored in the FVB 120. Any one of the addresses of the data stored in the FVB 120 may be read from the memory 130.

In operation S461, where it is determined that the address of the store command corresponds to any one of addresses stored in the FVB 120 in the operation S460, the FVB 120 invalidates contents of the data corresponding to the corresponding address of the FVB 120.

Where it is determined that the address of the store command is different from any one of addresses stored in the FVB 120 in operation S460, the FVB 120 ends an operation related to the store command.

Figure 5:
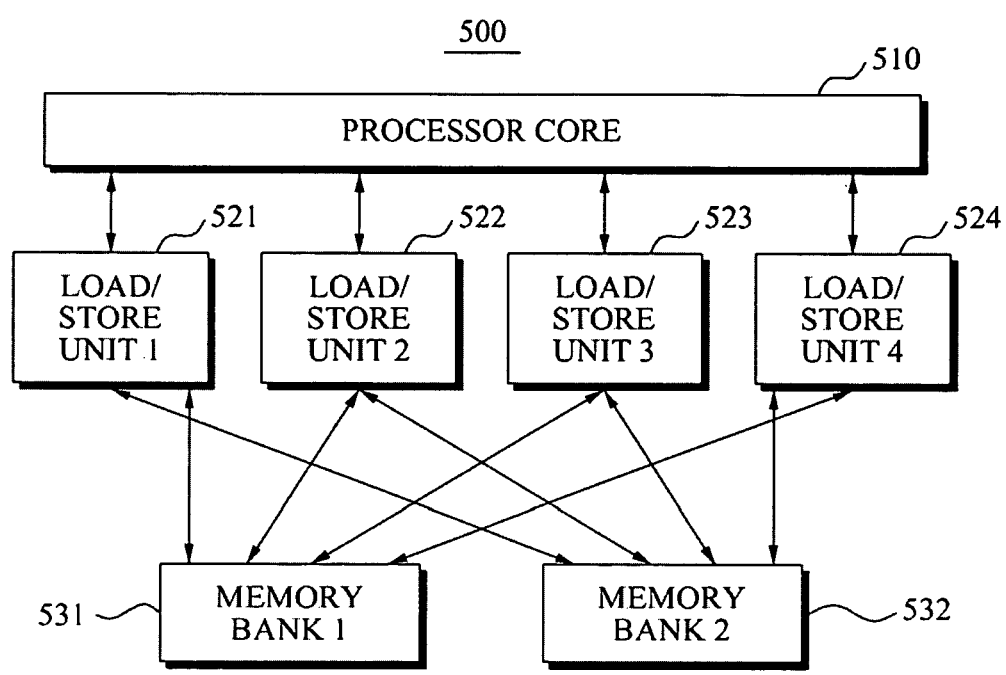
FIG. 5 is a diagram illustrating a computing system according to an exemplary embodiment.

FIG. 5 illustrates a computing system 500 according to an exemplary embodiment.

Referring to FIG. 5, the computing system 500 includes a processor core 510, four load/store units 521 through 524, and two memory banks 531 and 532.

The processor core 510 includes four ports (not shown), and communicates with the four load/store units 521 through 524 using the four ports.

For example, the processor core 510 may communicate with the load/store unit (1) 521 through a first port, and communicate with the load/store unit (2) 522 through a second port.

The four load/store units 521 through 524 process either a load command or a store command independently from each other.

Each of memory bank (1) 531 and memory bank (2) 532 receives data from the four load/store units 521 through 524 or outputs the data to the four load/store units 521 through 524.

The memory bank (1) 531 and the memory bank (2) 532 may perform a memory operation independently with each other. Each of the memory bank (1) 531 and the memory bank (2) 532 may include a buffer memory (not shown) to perform a multi-port function.

Figure 6:
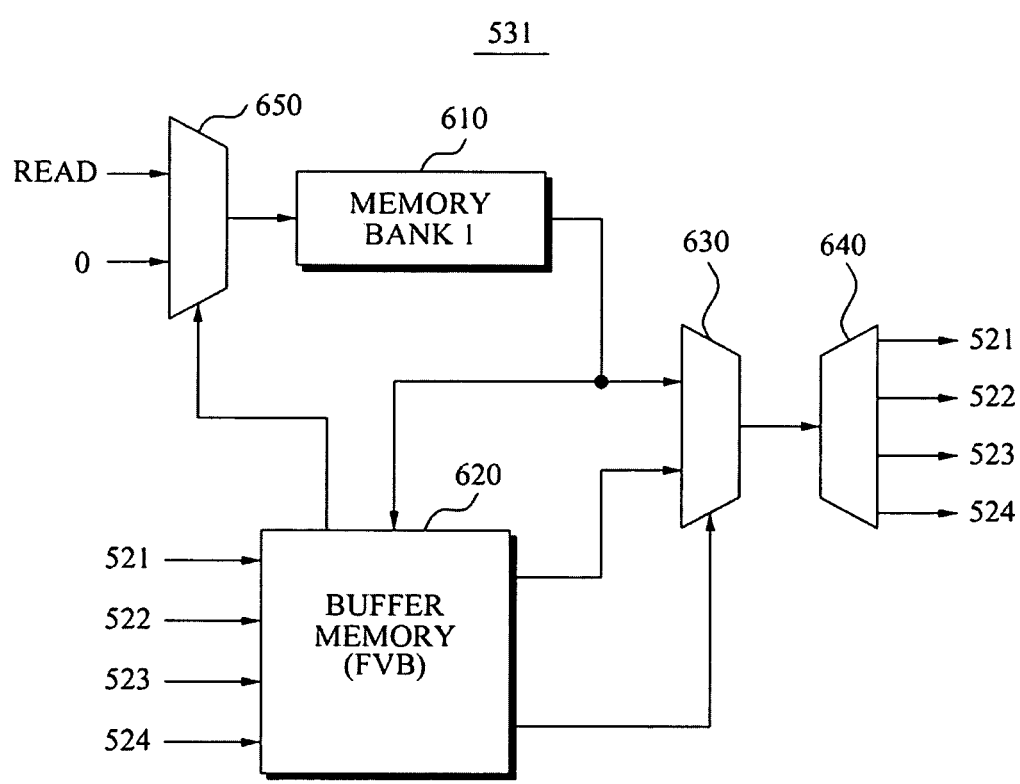
FIG. 6 is a diagram illustrating an exemplary memory bank of FIG. 5.

FIG. 6 illustrates an exemplary memory bank (1) 531 of FIG. 5.

Referring to FIG. 6, the memory bank (1) 531 includes a memory bank (1) 610 to store data and a buffer memory 620. The buffer memory 620 may be an FVB.

The memory bank (1) 610 may output either byte data or word data through either a single port or a plurality of ports.

The buffer memory 620 may include four ports to communicate with the four load/store units 521 through 524.

Where the memory bank (1) 610 outputs data by a read request, the buffer memory 620 may store the data outputted from memory bank (1) 610. The data requested by the processor core 510 (through any one of the load/store units 521 through 524) may be the byte data. The memory bank (1) 610 may output the word data including the byte data requested by the processor core 510, and the buffer memory 620 may store the word data outputted from memory bank (1) 610.

Where the processor core 510 requests the data through any one of the load/store units 521 through 524, the buffer memory 620 receives the request through any one of the four ports. For example, where the load/store unit (1) 521 requests the data, the buffer memory 620 receives the request through a first port corresponding to the load/store unit (1) 521.

The buffer memory 620 determines whether the requested data is stored in the buffer memory 620. Where an FVB hit (a case where the requested data is stored in the buffer memory 620 occurs, the buffer memory 620 may output a control signal to a multiplexer 650 and drop a read request signal (READ) with respect to the memory bank (1) 610. Where the FVB hit occurs, the buffer memory 620 outputs the stored data corresponding to the request to a multiplexer 630. The buffer memory 620 outputs the control signal to the multiplexer 630, the control signal denoting that the FVB hit occurred.

The buffer memory 620 may store an address of the word data along with the word data outputted from the memory bank (1) 610. The buffer memory 620 determines whether the address of the requested data corresponds to any one of addresses stored in the buffer memory 620 when determining whether the FVB hit occurs.

Where a read request from at least one of the load/store units 521 through 524 exists, the read request signal (READ) is enabled. The read request signal (READ) is transmitted to the multiplexer 650. The multiplexer 650 selects any one of "0" and the read request signal (READ) based on the control signal outputted from the buffer memory 620 and outputs the selected any one to the memory bank (1) 610. Where the FVB hit occurs, the multiplexer 650 may drop the read request signal (READ) with respect to the memory bank (1) 610 by selecting and outputting "0".

The multiplexer 630 may output any one of the data outputted from the memory bank (1) 610 and the data outputted from the buffer memory 620 based on the control signal outputted from the buffer memory 620. A value of the control signal is determined based on whether the FVB hit occurs. Where the FVB hit occurs, the multiplexer 630 may select the data outputted from the buffer memory 620 and output the selected data to a demultiplexer 640.

The demultiplexer 640 outputs the data outputted from the multiplexer 630 to any one of the load/store units 521 through 524. For example, where the requested data is requested from load/store unit (4) 524, the demultiplexer 640 outputs the data outputted from the multiplexer 630 to the load/store unit (4) 524, and the load/store unit (4) 524 outputs the data outputted from the demultiplexer 640 to the processor core 510.

Where an FVB miss occurs, the buffer memory 620 transmits the control signal to the multiplexer 650, the control signal enabling the read request signal (READ) to be transmitted to the memory bank (1) 610.

Where the data requested by the read request signal (READ) is the byte data, the memory bank (1) 610 outputs the word data including the requested byte data. The buffer memory 620 stores the address of the word data along with the word data outputted from the memory bank (1) 610.

Where the FVB miss occurs, the multiplexer 630 outputs the data outputted from the memory bank (1) 610.

The multiplexer 650 may include four multiplexers, and each multiplexer may output any one of "0" and the read request signal from any one of the load/store units 521 through 524. Where the FVB miss occurs, each read request signal is transmitted to the memory bank (1) 610. Where the data is simultaneously requested from at least two load/store units, the memory bank (1) 610 may adjust a sequence of data requests and sequentially process the data requests.

A circuit may be included to adjust the sequence of the data requests among the multiplexer 650 and the load/store units 521 through 524. The circuit may perform a function of processing a memory access conflict.

Figure 7:
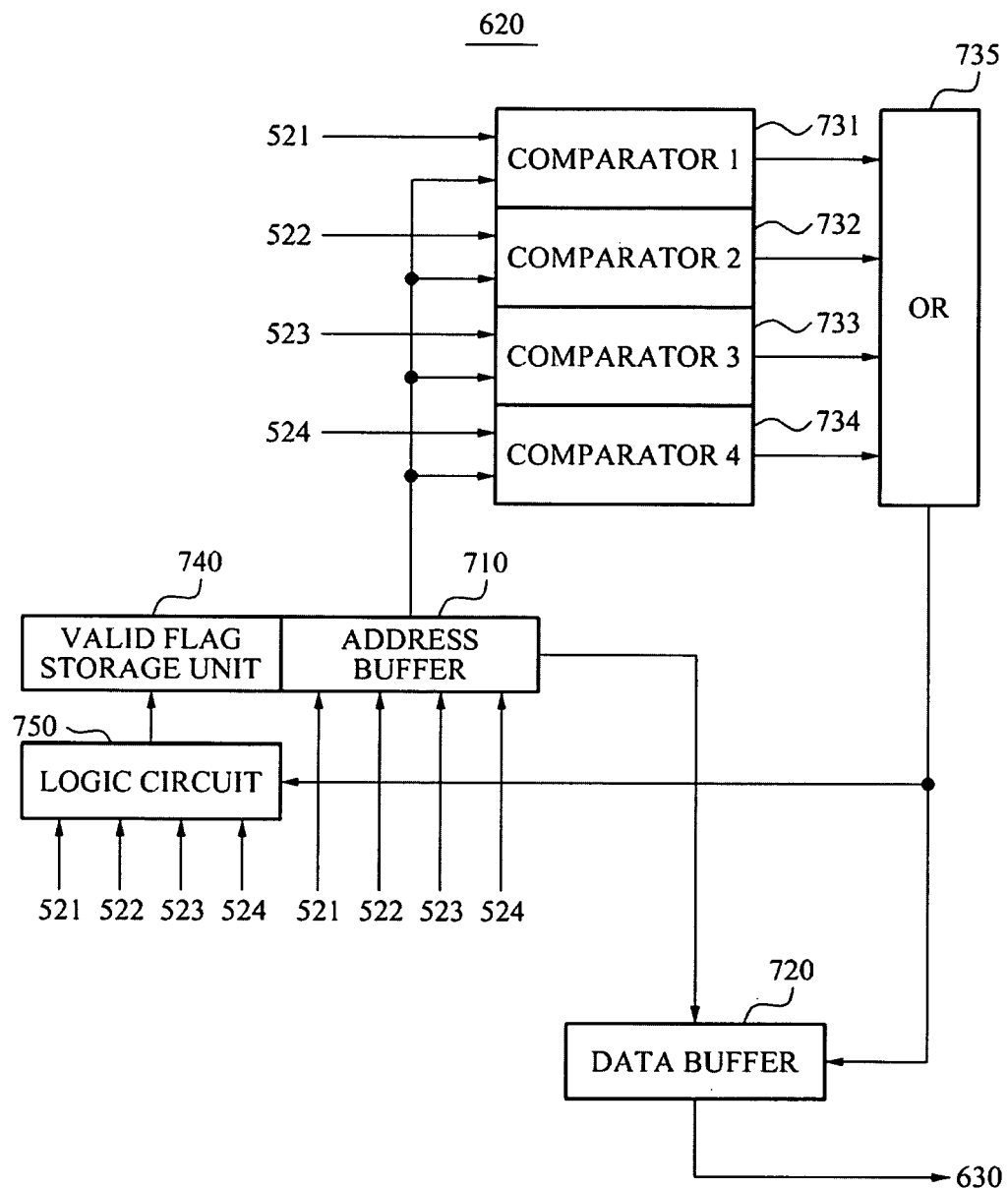
FIG. 7 is a diagram illustrating an exemplary buffer memory of FIG. 6.

FIG. 7 illustrates an exemplary buffer memory 620 of FIG. 6.

Referring to FIG. 7, the buffer memory 620 includes an address buffer 710 and a data buffer 720.

The buffer memory 620 may include four ports (not shown) to communicate with the load/store units 521 through 524. The address buffer 710 receives either a load command or a store command from the load/store units 521 through 524 through the four ports. Where the address buffer 710 receives either the load command or the store command from at least one of the load/store units 521 through 524, the address buffer 710 outputs addresses stored in the address buffer 710 to comparators 731 through 734.

The comparator (1) 731 separates an address from either the load command or the store command received from the load/store unit (1) 521. The comparator (1) 731 compares the separated address and the addresses transmitted from the address buffer 710. For example, where the address buffer 710 stores four addresses, the comparator (1) 731 compares the address separated from either the load command or the store command and the four addresses transmitted from the address buffer 710. The comparator (1) 731 may include four comparators (not shown).

The comparator (2) 732 corresponds to the load/store unit (2) 522, the comparator (3) 733 corresponds to the load/store unit (3) 523, and the comparator (4) 734 corresponds to the load/store unit (4) 524.

Where the four load/store units exist and the address buffer 710 stores four addresses, the buffer memory 620 includes 4×4=16 comparators. A number of necessary comparators may be shown as (a size of the address buffer 710)×(a number of ports).

Where any one same address exists based on a comparison result of the comparators 731 through 734, a logical OR circuit 735 enables an FVB hit signal.

A valid flag storage unit 740 stores valid flags corresponding to each of the addresses stored in the address buffer 710.

Where the FVB hit signal is enabled and the store command is received from any one of the load/store units 521 through 524, a logic circuit 750 searches for an address entry corresponding to the received store command in the address buffer 710, and invalidates the valid flag corresponding to the retrieved address entry.

Where the load command is received, the address buffer 710 may transmit a read control signal to the data buffer 720. Where the FVB hit signal is received from the logical OR circuit 735 and the read control signal is received from the address buffer 710, the data buffer 720 may output the data corresponding to the read control signal to the multiplexer 630.

The memory bank (1) 531 is described with reference to FIG. 6 and FIG. 7. However, it may be similarly applied to the memory bank (2) 532. The buffer memory 620 may be included in each of the memory bank (1) 531 and the memory bank (2) 532.

Figure 8:
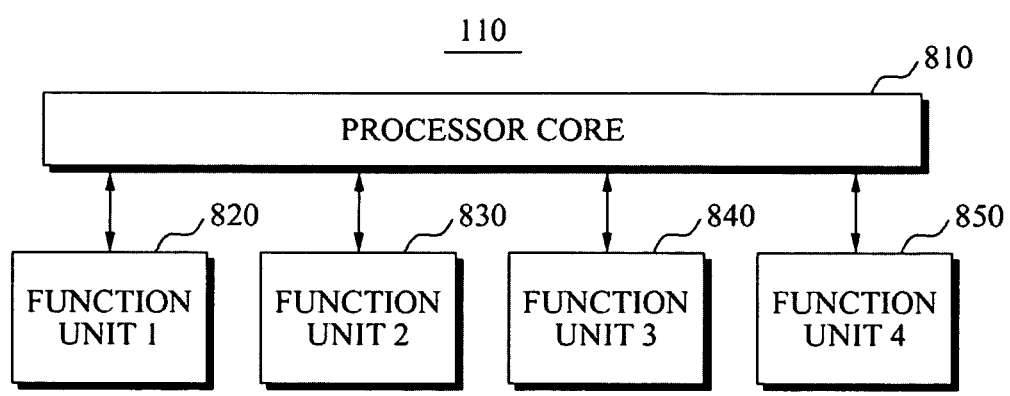
FIG. 8 is a diagram illustrating an exemplary multi-port processor core of FIG. 1.

FIG. 8 illustrates an exemplary multi-port processor core 110 of FIG. 1.

Referring to FIG. 8, the multi-port processor core 110 includes a processor core 810 and four function units 820 through 850. Each of the function units 820 through 850 may execute an operation in parallel with each other corresponding to a command. Which command is allocated and/or executed to which function unit may be determined by scheduling of a compiler (not shown) and may be determined by the processor core 810.

The multi-port processor core 110 may reduce a command processing time by allocating a plurality of commands to the function units 820 through 850 and executing the plurality of commands. The multi-port processor core 110 may execute an arithmetic or logical operation using the function units 820 through 850, and execute a memory operation (the load or store command) using the plurality of load/store units (not shown).

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims

What is claimed is:

1. A processor comprising:
a processor core configured to process data; and
a buffer memory configured to, in response to receiving a request for a first byte of data from the processing core, read byte data from a memory, the read byte data including the requested first byte of data and at least one other byte of data not requested by the processing core but which is located adjacent to the requested first byte of data, and to store the read byte data,
wherein the buffer memory is further configured to determine whether a second byte of data requested by the processor core is included in the read byte data that is stored in the buffer memory.

2. The processor of claim 1, wherein the processor core includes a plurality of input/output ports.

3. The processor of claim 1, wherein the buffer memory stores an address of the read byte data along with the read byte data, the address indicating a location of the read byte data in the memory,
compares an address of the second byte of data and the stored address, and
determines whether the second byte of data is stored in the buffer memory.

4. The processor of claim 1, wherein, in response to the second byte of data being stored in the buffer memory, the buffer memory outputs the stored second byte of data to the processor core.

5. The processor of claim 1, wherein, in response to the second byte of data being stored in the buffer memory, the processor core drops a data request of the second byte of data to the memory.

6. The processor of claim 1, wherein the buffer memory determines whether a fourth byte of data corresponding to an address of a third byte of data is stored in the buffer memory, the third byte of data to be stored in the memory by the processor core, and the buffer memory invalidates the stored read byte data including the stored fourth byte of data if the fourth byte of data is stored in the buffer memory.

7. The processor of claim 1, wherein the processor core accesses the memory without referring to the buffer memory for storing data in the memory.

8. The processor of claim 1, further comprising:
a plurality of load/store units connected with the processor core,
wherein the processor core processes a plurality of commands in parallel.

9. The processor of claim 1, wherein, in response to the processor determining that a requested operation is not a load operation, the buffer memory is further configured to
intercept an address of data corresponding to the requested operation,
determine whether the address of data is one of the data addresses stored in the buffer memory, and
in response to the address of data being a data address stored in the buffer, the buffer memory invalidates the contents of the data address stored in the buffer memory.

10. A buffer memory for connection with a processor core and a cache memory, wherein, in response to receiving a request for a first byte of data from the processing core, the buffer memory is configured to:
read byte data from the cache memory, the read byte data including the requested first byte of data and at least one other byte of data not requested by the processing core but which is located adjacent to the requested first byte of data,
store the read byte data in the buffer memory, and
determine whether a second byte of data requested by the processor core is included in the read byte data stored in the buffer memory.

11. The buffer memory of claim 10, further comprising:
a plurality of ports,
wherein the buffer memory processes in parallel a plurality of data requests from the processor core through the plurality of ports.

12. The buffer memory of claim 10, wherein the buffer memory stores an address of the read byte data read along with the read byte data, the address indicating a location of the read byte data in the cache memory,
compares an address of the second byte of data and the stored address, and
determines whether the second byte of data is stored in the buffer memory.

13. The buffer memory of claim 10, wherein, in response to the second byte of data being determined to be stored in the buffer memory, the buffer memory outputs the stored second byte of data to the processor core.

14. The buffer memory of claim 10, wherein the buffer memory determines whether a fourth byte of data corresponding to an address of a third byte of data is stored in the buffer memory, the third byte of data to be stored in the cache memory by the processor core, and the buffer memory invalidates the stored read byte data including the stored fourth byte of data if the fourth byte of data is stored in the buffer memory.

15. A computing system comprising:
   a processor core configured to process data;
   a memory; and
   a buffer memory configured to, in response to receiving a request for a first byte of data from the processing core, read byte data from the memory, the read byte data including the requested first byte of data and at least one other byte of data not requested by the processing core but which is located adjacent to the requested first byte of data, and to store the read byte data,
   wherein the buffer memory is further configured to determine whether a second byte of data requested by the processor core is included in the read byte data stored in the buffer memory.

16. The computing system of claim 15, wherein the processor core includes a plurality of input/output ports.

17. The computing system of claim 15, wherein the memory includes a plurality of banks, and the buffer memory corresponds to each bank one-to-one.

18. The computing system of claim 15, further comprising:
   a multiplexer to select one of data outputted from the memory and data outputted from the buffer memory based on whether the second byte of data requested by the processor core is stored in the buffer memory, and to output the selected data to the processor core.

19. The computing system of claim 15, wherein the buffer memory stores an address of the read byte data read from the memory along with the read byte data, the address indicating a location of the read byte data in the memory,
   compares an address of the second byte of data and the stored address, and
   determines whether the second byte of data is stored in the buffer memory.

20. The computing system of claim 15, wherein, in response to the second byte of data being stored in the buffer memory, the buffer memory outputs the stored second byte of data to the processor core.

\* \* \* \* \*